(12) United States Patent
Duncan et al.

(10) Patent No.: US 8,705,804 B2
(45) Date of Patent: Apr. 22, 2014

(54) METHOD FOR INTERPRETING DIPPING NATURAL FRACTURE AND FAULT PLANES IDENTIFIED FROM BOREHOLE IMAGES

(75) Inventors: Andrew R. Duncan, The Woodlands, TX (US); Jens Klaus Hustedt, The Woodlands, TX (US); Hermann Josef Homann, Houston, TX (US); Jarret Borell, Mustang, OK (US); Ramiro Gabriel Lopez, Buenos Aires (AR)

(73) Assignee: Fronterra Integrated Geosciences, LLC, Houston, TX (US)

( * ) Notice: Subject to any disclaimer, the term of this patent is extended or adjusted under 35 U.S.C. 154(b) by 88 days.

(21) Appl. No.: 12/807,771

(22) Filed: Sep. 14, 2010

(65) Prior Publication Data

US 2011/0064277 A1 Mar. 17, 2011

Related U.S. Application Data

(60) Provisional application No. 61/276,690, filed on Sep. 14, 2009.

(51) Int. Cl.
*G06K 9/00* (2006.01)

(52) U.S. Cl.
USPC .......................................... 382/108; 382/109

(58) Field of Classification Search
USPC ........................... 382/108, 109; 345/582, 588
See application file for complete search history.

(56) References Cited

U.S. PATENT DOCUMENTS

| | | | |
|---|---|---|---|
| 6,088,656 A | | 7/2000 | Ramakrishnan et al. |
| 6,226,595 B1 * | | 5/2001 | Rossi et al. ............. 702/10 |
| 6,266,618 B1 * | | 7/2001 | Ye et al. ............. 702/10 |
| 6,885,947 B2 | | 4/2005 | Xiao et al. |
| 7,243,718 B2 | | 7/2007 | Chen et al. |
| 7,505,851 B2 | | 3/2009 | Bal et al. |
| 7,894,990 B2 | | 2/2011 | Wang et al. |
| 7,953,587 B2 | | 5/2011 | Bratton et al. |
| 2005/0192753 A1 * | | 9/2005 | Wang et al. ............. 702/11 |
| 2008/0021653 A1 | | 1/2008 | Kear et al. |
| 2011/0091078 A1 * | | 4/2011 | Kherroubi et al. ........... 382/109 |

OTHER PUBLICATIONS

International Search Report for PCT/US10/02493 mailed Nov. 3, 2010.
PCT Written Opinion of the ISA, mailed Nov. 3, 2010 for PCT/US10/02493.

* cited by examiner

*Primary Examiner* — Edward Park
(74) *Attorney, Agent, or Firm* — Thompson & Knight, L.L.P.; Jennifer S. Sickler

(57) ABSTRACT

A method of interpreting specific dipping surfaces in earth formations, namely, fracture and fault planes from borehole images. The method is applicable to borehole images obtained from any borehole imaging tool, regardless of tool physics or acquisition type. The interpretation method provides for detailed description of feature s in order to provide a robust framework for subsequent interpretation work.

3 Claims, 6 Drawing Sheets

METHOD FOR INTERPRETING DIPPING NATURAL FRACTURE AND FAULT PLANES IDENTIFIED FROM BOREHOLE IMAGES

CROSS-REFERENCE TO RELATED APPLICATION

This application claims priority to U.S. Provisional Patent Application Ser. No. 61/276,690, filed Sep. 14, 2009, for "Method for Interpreting Dipping Natural Fracture and Fault Planes Identified From Boreholes."

TECHNICAL FIELD

This invention relates to a method of interpreting specific dipping surfaces from borehole images. In particular, the invention relates to an improved method of interpreting faults and fractures from borehole images. The method may be applied to images obtained from any borehole imaging tool regardless of tool physics or acquisition type.

BACKGROUND OF THE INVENTION

Various methods have been used to interpret specific dipping surfaces, namely, faults and fractures. These interpretation methods are applied to images obtained from various borehole imaging tools. Examples of the available tool technology and potential sources for such tools includes, but is not limited to: wireline technology, such as resistivity/conductivity imaging using conductive muds (e.g., Schlumberger's FMI & FMS, Baker Atlas' STAR, Halliburton's EMI & XRMI, Weatherford's HMI & CMI), and non-conductive muds (e.g., Schlumberger's OBMI, Baker Atlas' EARTH, Halliburton's OMRI); azimuthal resistivity imaging (e.g., Schlumberger's ARI); acoustic/sonic imaging (e.g., Schlumberger's UBI, Baker Atlas' CBIL, Halliburton's Cast-V); and logging while drilling technology, such as gamma ray imaging, density imaging (e.g., Schlumberger's ADN, Baker Inteq's LithoTrak, and Weatherford's AZD, Halliburton's ALD), and electrical/resistivity imaging (e.g., Schlumberger's Geovision, Baker Inteq Star Trak, and Halliburton's AFR).

Numerous commercial software packages specifically developed for the processing, display and extraction of geological data from borehole images are currently available (e.g., Petris' RECALL™, TerraSciences' TerraStation™). Further, methodologies for the identification and trigonometric measurement of dipping, planar surfaces in borehole images are already well established. See e.g., U.S. Pat. No. 5,960,371. However, the specific terminology used in the subsequent description and interpretation of such surfaces varies, and is in many cases equivocal and/or subjective.

The terminology used to describe the features identified and measured is usually left to the discretion of the individual operator/geologist, or to internal procedures established with their organization. The terminology may be related to the appearance of the feature being identified or measured, according to the specific tool physics used in the particular borehole image being analyzed. Such terminology may be descriptive, but is generally only valid for the specific data being analyzed and for one, or perhaps more than one, tool type.

As a result, the terminology currently used could impart different meanings to a reader, depending upon their background and/or level of understanding of that terminology. Table 1 below, summarizes the commonly used interpretation terminology.

TABLE 1

Commonly Used Interpretation Terminology

| Current Terminology, As Applied To Fracture And Fault Planes | Comments |
|---|---|
| Open<br>Closed<br>Cemented<br>Mineralized<br>Healed<br>Shear<br>Stress<br>Mixed<br>Partially Open<br>Partially Cemented | These terms are ten examples of interpretive terminology that relies upon the subjective opinion of the individual operator or geologist analyzing the borehole image to identify various geological features. Due to the subjective nature of these terms, individual operators or geologists are often free to create new categories "on the fly." |
| Resistive<br>Conductive<br>High Amplitude<br>Low Amplitude<br>Fast<br>Slow | These terms are six examples of tool-feature terminology that is specific to the various borehole imaging tool-types employed, and may, or may not be, applicable from one tool technology to another. This tool-feature terminology assumes an intimate knowledge of the borehole imaging technology being used, and, therefore, the terms are prone to misinterpretation outside the immediate borehole imaging community. |
| Open/Conductive<br>Cemented/Resistive | These terms are two examples of hybrid terminology that attempt to include tool-related features and geological interpretation. Again, these terms are subject to differences in interpretation. |

Thus, an interpretation method is needed that may be applied to images obtained from any borehole imaging tool regardless of tool physics or acquisition type, and that is compatible with any of the commercial software packages specifically developed for the processing, display and extraction of geological data from borehole images, and that is independent of the tool technology used to obtain such borehole images.

SUMMARY OF THE INVENTION

A method of interpreting specific dipping surfaces, namely, faults and fractures, is disclosed. The method can be applied to images obtained from any borehole imaging tool regardless of the tool physics (i.e., resistivity/conductivity and acoustic tool types) or acquisition type (i.e., wireline, pipe-conveyed, logging while drilling, etc.). Further, the method is compatible with the software packages specifically developed for the processing, display and extraction of geological data from borehole images that are currently available (e.g., Petris' RECALL™, TerraSciences' TerraStation™).

A display of a borehole image, which is obtained from a cylindrical borehole, most commonly presents a two-dimensional representation of the inner surface of the borehole with reference to geographic or true north, or in the case of highly angled boreholes, to the borehole high-side. Any dipping planar features that intersect the borehole, therefore, describe a sinusoid. The position and magnitude of that sinusoid then defines the position of the dipping plane in three-dimensional space.

The dipping planar features recognized in borehole images are defined by the relative contrast variation between those features and the background response of the formation being imaged. This contrast variation may differ greatly between differing logging tool technologies and recording methodologies employed to create that image. For example, a specific type of fracture or fault that appears much darker than the background when imaged using water-based imaging technology (e.g., reference) could appear to be much brighter than the background when imaged using oil-based imaging technology.

This method of fracture and fault interpretation employs the objective description of each feature as seen in the borehole image being analyzed. The basis of the interpretation uses the apparent contrast between the feature being described/defined and its background. Only features showing this contrast variation along at least part of their length will be visible in the borehole image. However, a fracture or fault that is not apparent using one imaging technology may, or may not, be apparent in another. The actual description is therefore separated from, and independent of, the tool technology used to create the image. See generally, FIGS. 3 and 4. As a result, these descriptions can form an objective basis for the subsequent interpretation of the fracture or fault defined. The inclusion of all local and regional knowledge, non-imaging tool log data, core data and any other relevant sources of corroborative support will be used in the subsequent interpretation of the feature described in this way. Table 2 below, summarizes the uniform terminology used in connection with this invention:

TABLE 2

Uniform Fracture And Fault Interpretation Terminology

| Fracture Terminology | Observed Shear | Fault Terminology | Comments |
| --- | --- | --- | --- |
| High Contrast, Dark | Yes No | High Contrast, Dark | This uniform fracture and fault interpretation terminology allows the geologist to accurately identify and describe the feature independent of the borehole imaging technology being used. |
| High Contrast, Light | Yes No | High Contrast, Light | |
| High Contrast, Mixed | Yes No | High Contrast, Mixed | |
| Low Contrast | Yes No | Low Contrast | |
| Tensile Enhanced | N/A | | This category provides for the existence of natural fractures that may only be recognized as a result of effects of in-situ stresses on the borehole being analyzed. |

This method of fracture and fault interpretation also includes a consistent way of describing fracture planes that are terminated, in various ways, within the three-dimensional space of the borehole. A fracture may terminate on other planar surfaces, such as bedding planes, other fracture surfaces, faults or within a specific lithological unit (i.e., without contact with any other visible feature).

There may be instances where there is insufficient contrast between the feature and the background formation (e.g., a low porosity, siliceous-mineralized fracture within a low porosity, siliceous matrix; or similarly a carbonate-cemented fracture within a carbonate matrix of similar density and porosity). Some natural fractures are only seen within the region of the borehole affected by the maximum horizontal, in-situ regional stress (i.e., the region of the borehole in tension).

These fractures are therefore defined as "Tensile Enhanced Fractures". As with other fractures, their visual appearance in the borehole image varies according to the technology and drilling practices employed. Although they may strike parallel or near-parallel to the direction of maximum horizontal stress, they must not be confused with fractures induced by the drilling of the borehole. Because of their importance as points of potential fluid transmission between fractures, the method additionally records the intersecting connections between differing fracture types.

The method also takes into account the presence or absence of movement or shear along the fracture plane. Within the geological community there are differences in the application and understanding of the terms "fault" and "shear fracture". This method defines the presence of shear, seen in a borehole image, as visible offset of other features (e.g., bedding, other fractures) by a fracture plane, where the offset is smaller (or much smaller) than the diameter of the borehole. This definition includes features that may be described elsewhere as faults or microfaults. See e.g., J. R. RAMSEY AND M. I. HUBER, THE TECHNIQUES OF MODERN STRUCTURAL GEOLOGY, VOL 2., FOLDS AND FRACTURES 700 (Academic Press 1987). Such fault description is consistent with a pragmatic approach to fault definition based on the field of study and size of the study area. See e.g., N. J. PRICE AND J. W. COSGROVE, ANALYSIS OF GEOLOGICAL STRUCTURES 502 (Cambridge Univ. Press 1990). For the purposes of the consistent description of faults from borehole images, this method defines a fault as a planar feature where the amount of offset (i.e., throw) is not directly observed, since it is greater (or much greater) than the diameter of the borehole. It should be noted that images are typically acquired from boreholes that range in diameter between about 4.55 inches and about 21 inches.

The method may also include information regarding whether the feature cuts the entire wellbore or is truncated (e.g., against bedding surfaces or other fractures). In addition, it will be possible to identify the various fracture-fracture connections. Fault zones may also show multiple discontinuities and may be accompanied by zones of shattering or brecciation. Information about the imaging tool technology, along with all other supporting evidence, may be used to create a comprehensive interpretation of the features encountered.

A preferred embodiment of the invention comprises a system residing on a computer readable medium for interpreting dipping surfaces in an earth formation from borehole images, comprising a first system for transforming borehole image data from multiple sources to describe each feature in a section of said borehole; calculating the contrast between the feature and its background; interpreting dipping surfaces from the borehole images based upon the feature descriptions and the calculated contrast; and using said interpretation to characterize a region of said earth formation.

A preferred method of the invention comprises a method for interpreting dipping surfaces from borehole images comprising obtaining data from a borehole image from multiple sources; calculating description of each feature in a borehole image based upon contrast between the feature and its background; interpreting the features based upon the contrast-based feature descriptions; and interpreting a geological feature based upon the feature interpretation.

Other features and advantages of the present invention will be apparent to those of ordinary skill in the art upon reference to the following detailed description taken in conjunction with the accompanying drawings.

BRIEF DESCRIPTION OF THE DRAWINGS

For a further understanding of the nature and objects of the present invention, reference should be made to the following detailed disclosure, taken in conjunction with the accompanying drawings, and wherein.

DETAILED DESCRIPTION OF PREFERRED EMBODIMENTS OF THE INVENTIONS

In general, the present invention addresses the issue of operator objectivity/subjectivity by creating a consistent method of reference to dipping fracture and fault planes identified in borehole images. It, therefore, also provides a consistent framework for the interpretation of those features identified. For the purposes of borehole image interpretation, a fault is defined as a planar, or near planar, feature that shows offset (i.e., throw) that is greater than the borehole diameter (i.e., typically ranging between 4.5 inches and 21 inches in diameter).

Figure 1:
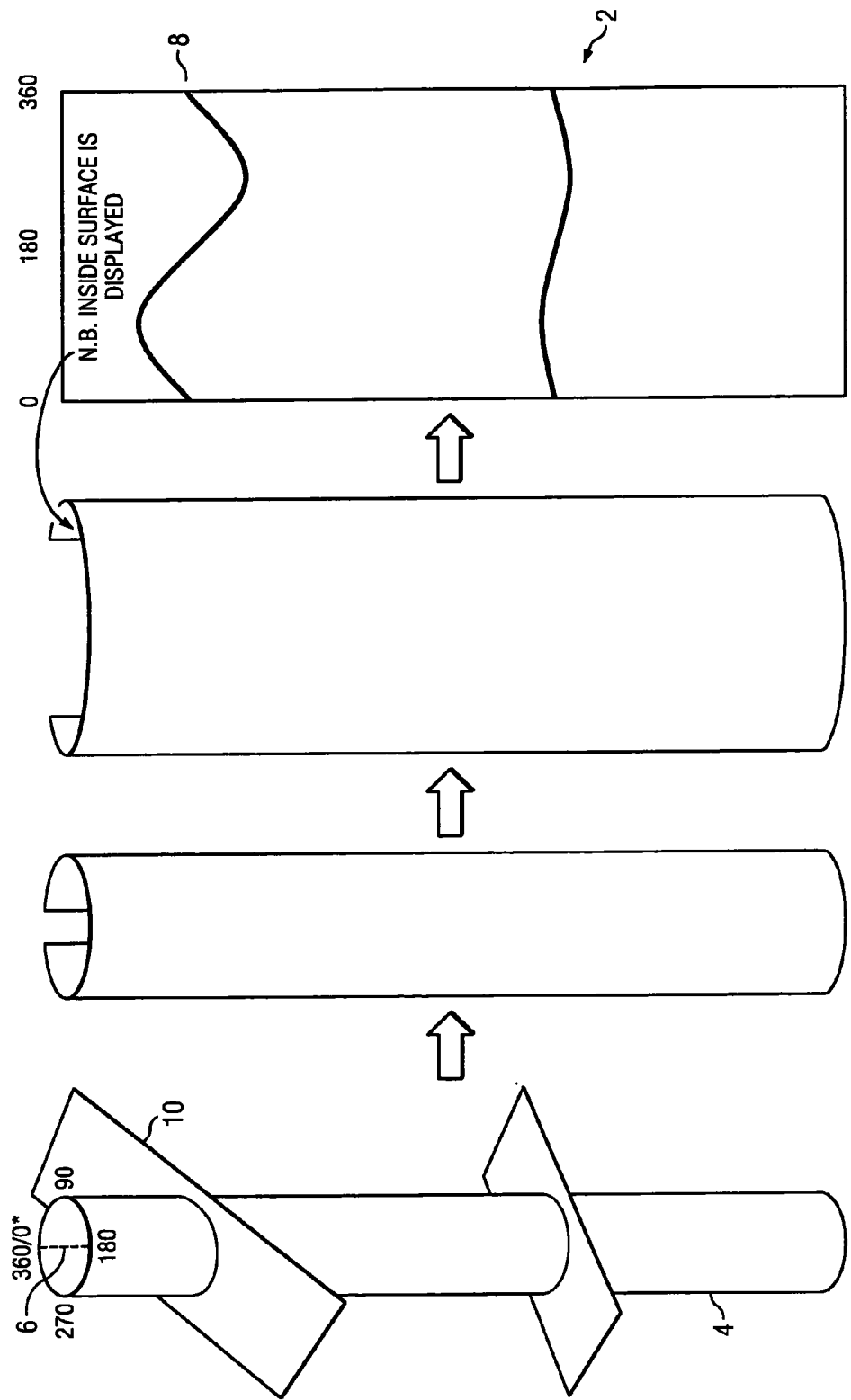
FIG. 1 is schematic illustrating how images from a cylindrical borehole are viewed in two dimensions, where the dotted line represents true north, or in the case of a highly inclined or horizontal borehole, the borehole high side.

As is shown in FIG. 1, a display of borehole images 2, which is obtained from a cylindrical borehole 4, most commonly presents a two-dimensional representation of the inner surface of the borehole with reference to geographic or true north 6, or in the case of highly angled boreholes, to the borehole highside. The dotted line represents true north, or in the case of a highly inclined or horizontal borehole 14, the borehole highside. See FIG. 1. The borehole image 2 displays a two-dimensional picture of the inner surface of the borehole. Id.

Figure 2:
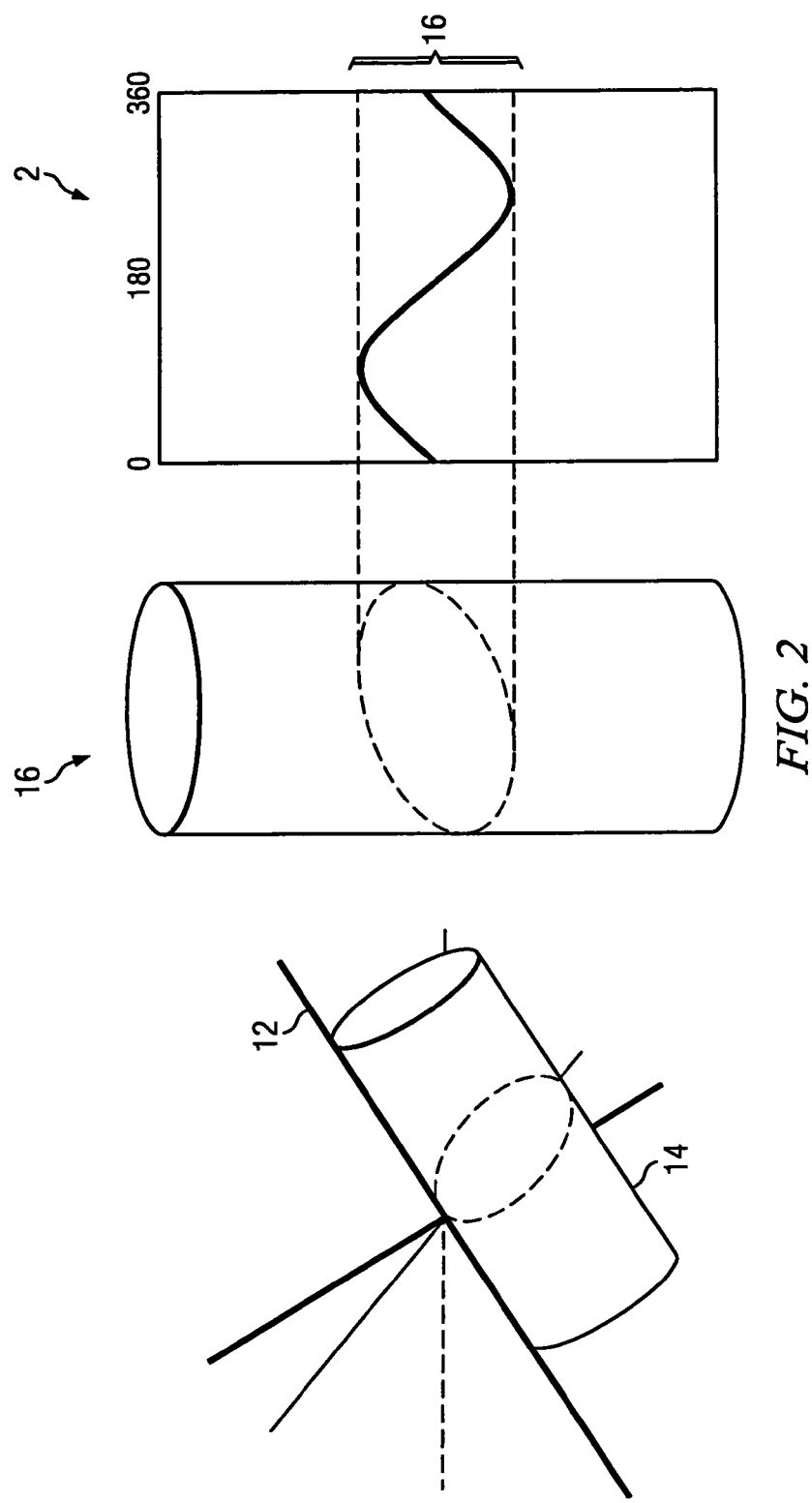
FIG. 2 is a schematic illustrating how dipping planes are represented in images by sinusoids.

Any dipping planar features that intersect the borehole 4, therefore, describe a sinusoid 8. As is shown in FIG. 2, the position and magnitude of that sinusoid 8 then defines the position of the dipping plane 10 in three-dimensional space. As an example, an inclined bed 12 is intersected by an inclined borehole 14. See FIG. 2. However, during the analysis of the borehole image 2, the borehole axis 16 is displayed as though it is vertical. Id. Accordingly, the attitude 16 of the observed sinewave represents the apparent dip. Id. Therefore, the software used to display the borehole image is also used to calculate the true dip data value in three-dimensional space.

Figure 3:
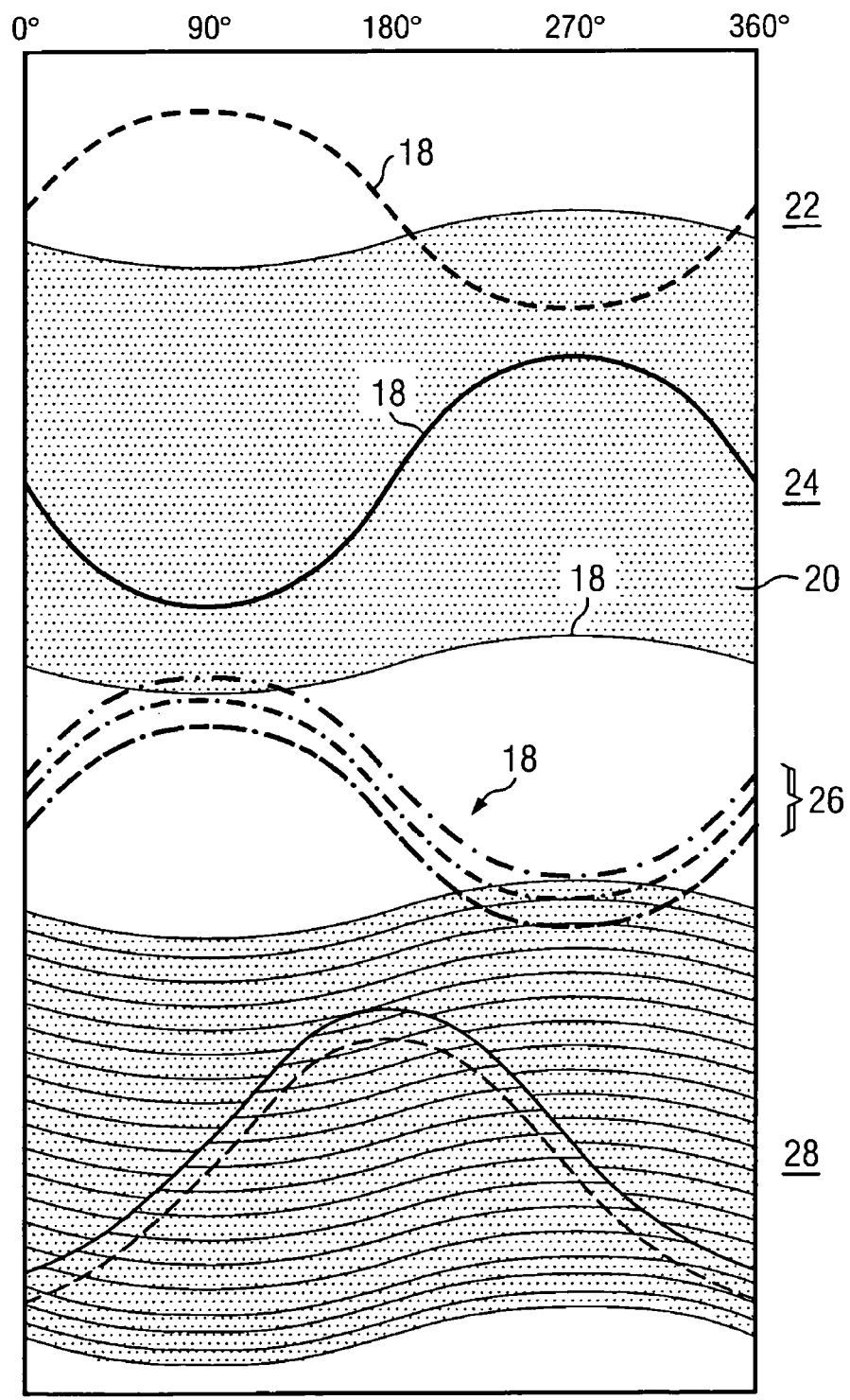
FIG. 3 is a schematic illustrating the appearance of fractures in borehole images.

As is shown in FIG. 3, the dipping planar features 18 recognized in borehole images 2 are defined by the relative contrast variation between those features 18 and the background response 20 of the formation being imaged. This contrast variation may differ greatly between different logging tool technologies and recording methodologies employed to create that image. For example, a specific type of fracture or fault 18 that appears much darker than the background when imaged using water-based imaging technology (e.g., reference) could appear to be much brighter than the background 20 when imaged using oil-based imaging technology.

This method of fracture and fault interpretation employs the objective description of each feature 18 as seen in the borehole image 2 being analyzed. The basis of the interpretation uses the apparent contrast between the feature 18 being described/defined and its background 20. Only features 18 showing this contrast variation along at least part of their length will be visible in the borehole image 2, however, a fracture or fault 18 that is not apparent using one imaging technology may, or may not, be apparent in another. The actual description is therefore separated from, and independent of, the tool technology used to create the image. See generally, FIGS. 3 and 4. As a result, these descriptions can form an objective basis for the subsequent interpretation of the fracture or fault 18 defined. The inclusion of all local and regional knowledge, non-imaging tool log data, core data and any other relevant sources of corroborative support will be used in the subsequent interpretation of the feature described in this way.

Figure 4:
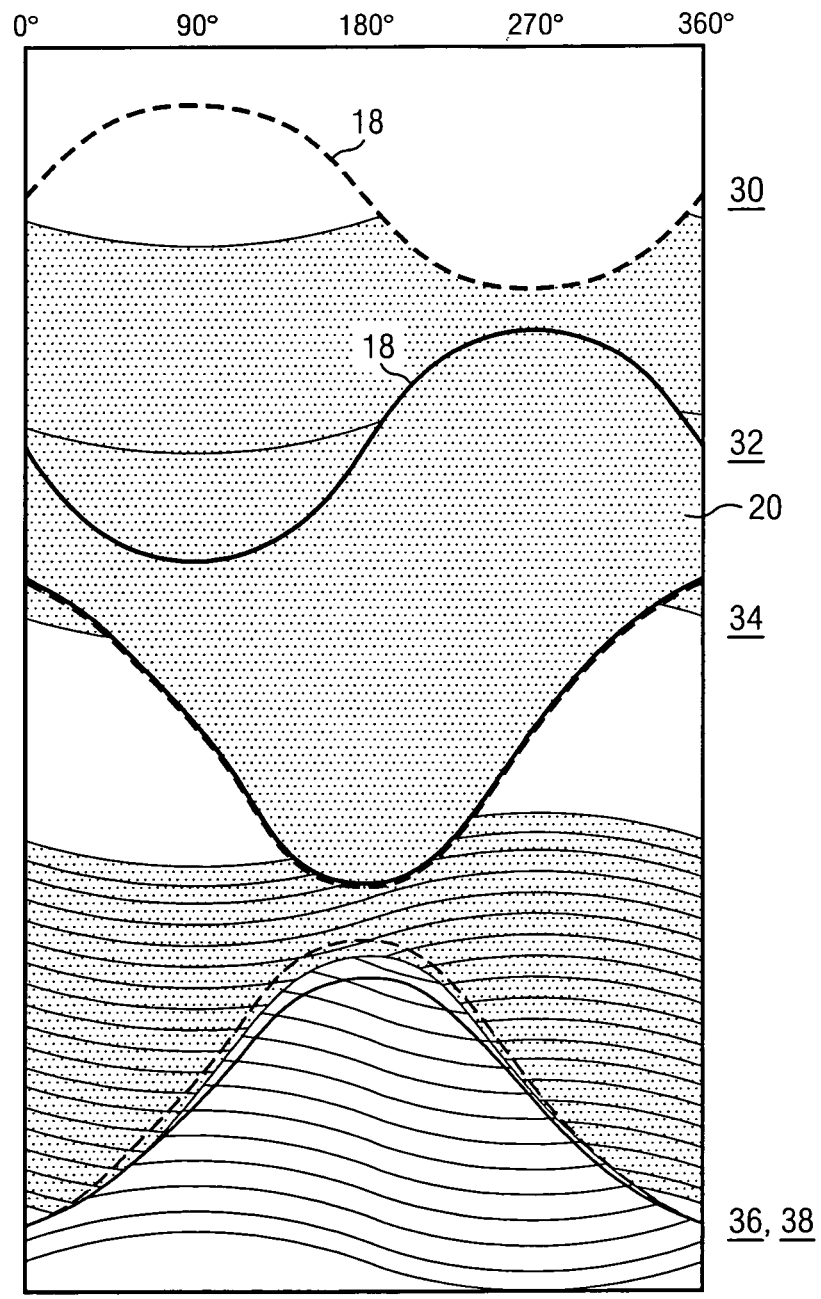
FIG. 4 is a schematic illustrating the likely appearance of faults in borehole images.
Figure 5:
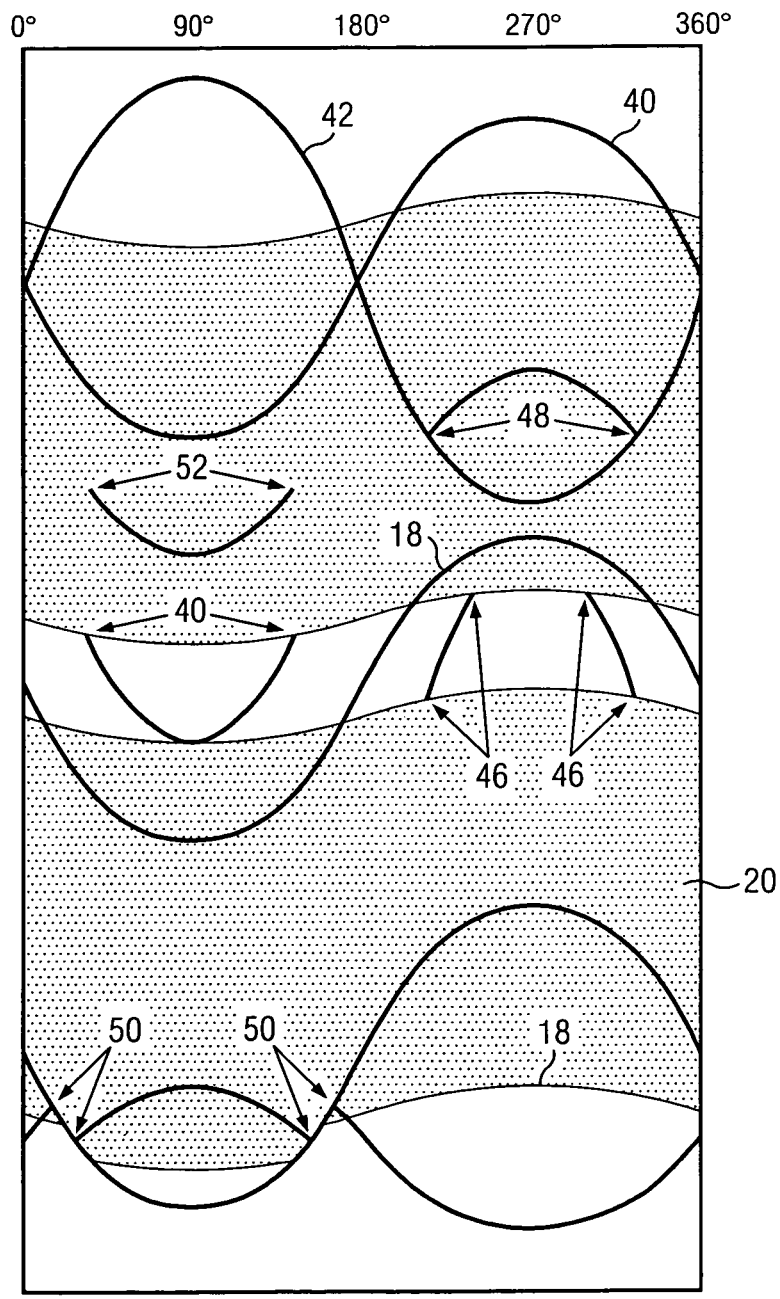
FIG. 5 is a schematic illustrating fracture termination and truncation habits as seen in borehole images.

As is shown in FIGS. 4 and 5, fracture and fault plane features 18 are identified in borehole images 2 from a difference in the apparent contrast of the observed feature (i.e., sinusoid, partial sinusoid or, at least, some part of the sinusoid or partial sinusoid). The relative contrast may be said to be high, when the feature 18 is significantly darker, significantly lighter than the background formation response 20, or some mixture of light and/or dark, or low, when either slightly higher or slightly lower than the background response 20. In addition, subtle features 18 that show no significant contrast difference, but that can be discerned due to minor shear offset of bedding (or other features, including other fractures) may also included in the "Low Contrast" category.

As is shown in FIG. 3, the four principal fracture types are illustrated and described. For example, a high contrast fracture feature that is lighter than the background formation/matrix 22 is illustrated in FIG. 3. The "High Contrast, Light" interpretation includes the "Resistive" category commonly used for resistivity images, or the "High Amplitude" category (i.e., mineralized fractures, potentially open if observed in OBM images only) used for acoustic images. A high contrast fracture feature that is darker than is background formation/matrix 24 is also shown in FIG. 3. The "High Contrast, Dark" interpretation includes the "Conductive" category commonly used for resistivity images, or the "Low Amplitude" category (i.e., potentially open, or mineralized by conductive material such as clays) used for acoustic images. A high contrast, mixed fracture feature 26 may be partially lighter, partially darker or possibly both. See FIG. 3. The "High Contrast, Mixed" interpretation includes the "Partially Mineralized," "Partially Open" or both categories, which are commonly observed in carbonate lithologies. A low or no contrast fracture features 28 may be discerned from small (or even very small) discontinuities or offset (i.e., shear) of bedding panes or other features. See FIG. 3. The "Low Contrast" interpretation includes the "Closed" category (i.e., no mineralization and no open void/porosity).

As is shown in FIG. 4, the common fault plane types are illustrated and described. A high contrast, light fault plane feature 30 may be potentially mineralized if water-based resistivity image or it may be potentially permeable/open if observed in OBM images only. The "High Contrast, Light" interpretation includes the "Potentially Mineralized" category used for water-based resistivity images, and the "Potentially Permeable/Open" category used in OBM images. A high contrast, dark fault plane feature 32 may be mineralized with conductive material such as clays, filled with conductive fluid if observed in WBM image (i.e., permeable/open), filled with conductive fluid at the borehole edges (i.e., spalled), or any combination of the above. See FIG. 4. The "High Contrast, Dark" interpretation includes the "Permeable/Open" category used in WMB images. A high contrast, mixed fault plane feature 34 and a low contrast feature 36 are illustrated in FIG. 4. A low contrast fault plane feature 36 is less common, however, in some boreholes, the actual fault plane may be quite subtle due a lack of significant contrast or a significant damage or brecciation to the zone. In addition, multiple discontinuities 38 may be seen at some fault boundaries. See FIG. 4.

The method takes into account the presence or absence of movement or shear along the fracture plane. This method defines the presence of shear, seen in a borehole image 2, as visible offset of other features (e.g., offset of bedding or other fractures) by a fracture plane, where the offset is smaller (or much smaller) than the diameter of the borehole. For the purposes of the consistent description of faults 18 from borehole images 2, this method defines a fault 18 as a planar feature where the amount of offset (i.e., throw) is not directly observed, since it is greater (or much greater) than the diameter of the borehole.

As is shown in FIG. 5, a fracture 18 that intersects the entire borehole 4 will show a complete sinewave. A full sinewave fracture with no shear 40 (i.e., no offset of bedding or other fractures) and a full sinewave fracture with apparent shear 42 (i.e., offset of bedding and/or other pre-existing fractures) are illustrated in FIG. 5. Some fractures only show a partial sinewave 44. See FIG. 5. These partial fractures can show a variety of different termination types:

1) Type 1 terminates against a bedding surface 46;
2) Type 2 terminates against other fractures 48;
3) Type 3 terminates against a shear fracture 50 (i.e., offset by and, therefore, predates the shear fracture); and
4) Type 4 terminates within a particular bed, but not against any obvious or visible surface 52.

See FIG. 5.

There may be instances where there is insufficient contrast between the feature 18 and the background formation 20 (e.g., a low porosity, siliceous-mineralized fracture within a low porosity, siliceous matrix; or similarly a carbonate-cemented fracture within a carbonate matrix of similar density and porosity). Some natural fractures 18 are only seen within the region of the borehole 4 affected by the maximum horizontal, in-situ regional stress (i.e., the region of the borehole in tension).

Figure 6:
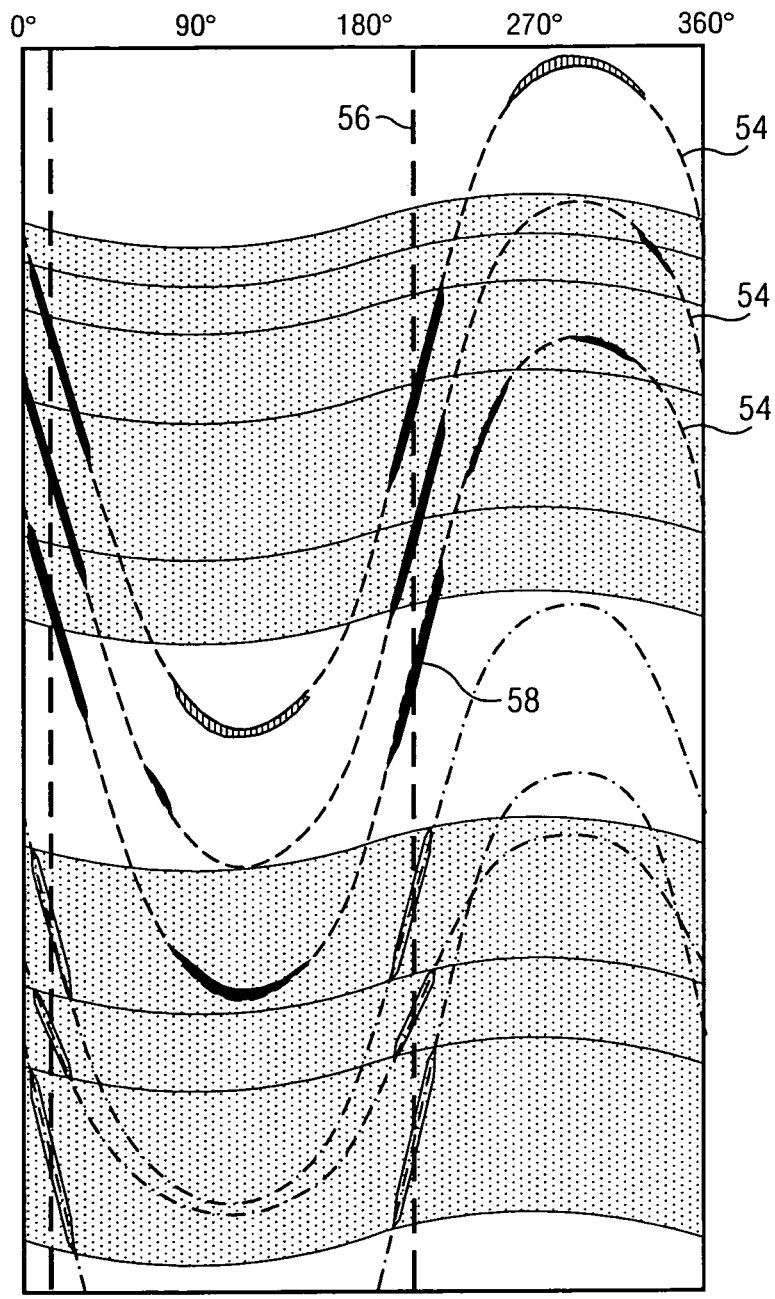
FIG. 6 is a schematic illustrating tensile enhanced features.

These fractures 18 are defined as "Tensile Enhanced Fractures" 54. As with other fractures 18, their visual appearance in the borehole image 2 varies according to the technology and drilling practices employed. See FIG. 6. Because of their importance as points of potential fluid transmission between fractures, the method additionally records the intersecting connections between differing fracture types.

Tensile Enhanced Fractures 54 are natural fractures that frequently strike parallel or near-parallel to the maximum horizontal stress direction 56 (i.e., SHmax). As a result of this interaction, they are enhanced 58 (i.e., partially opened), but only in the part of the borehole that is in tension (i.e., parallel to the SHmax direction). Outside this region of the borehole, they will show either no significant contrast, or only localized, very subtle contrast variation. The enhanced parts 58 of the fractures will be of higher contrast (i.e., either lighter or darker, than the background formation depending upon the tool physics and the borehole mud system/type). It should be noted that fractures in other orientations (i.e., not parallel or near-parallel) may also undergo some degree of enhancement in the part of the borehole that is in tension.

In addition, other characteristics of the fractures 18 identified in the interpretation method include, but are not limited to:

Presence or absence of visible offset (i.e., shear) along the fracture plane,
Partial (i.e., truncated or otherwise terminated) or full sinusoid (i.e., present across the entire wellbore), and
Intersection between the differing fracture types encountered.

A preferred embodiment of the invention comprises a system residing on a computer readable medium for interpreting dipping surfaces in an earth formation from borehole images, comprising a first system for transforming borehole image data from multiple sources to describe each feature in a section of said borehole; calculating the contrast between the feature and its background; interpreting dipping surfaces from the borehole images based upon the feature descriptions and the calculated contrast; and using said interpretation to characterize a region of said earth formation. Software programs known to those skilled in the art is used for the calculation, interpretation, and identification steps of the present system.

A preferred method of the invention comprises a method for interpreting dipping surfaces from borehole images comprising obtaining data from a borehole image from multiple sources; calculating description of each feature in a borehole image based upon contrast between the feature and its background; interpreting the features based upon the contrast-based feature descriptions; and interpreting a geological feature based upon the feature interpretation. Software of the type known to those skilled in the art is used for the calculation, interpretation, and identification steps of the present system.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A system residing on a tangible non-transitory computer readable medium for using observed contrast to analyze dipping surfaces in earth formations from borehole images, comprising:
    a) a first system on a tangible non-transitory computer readable medium for transforming borehole image data from multiple sources to create a composite description independent of tool technology of each feature in a section of said borehole;
    b) calculating a contrast between the feature and its background;
    c) interpreting dipping surfaces from the borehole images based upon the feature composite descriptions and the calculated contrast; and
    d) using said interpretation to characterize a region of said earth formation.

2. A method for using observed contrast to analyze dipping surfaces from borehole images comprising:
    a) obtaining data from a borehole image from multiple sources;
    b) calculating a composite description independent of tool technology of each feature in a borehole image based upon contrast between the feature and its background;
    c) interpreting the features based upon the contrast-based feature descriptions; and
    d) interpreting a geological feature based upon the feature interpretation.

3. A computer program product embodied on a tangible non-transitory computer readable medium for using observed contrast to analyze dipping surfaces in each formation from borehole images, the computer program product comprising computer readable code for causing a processor to perform the steps of:
  a) obtaining data from a borehole image from multiple sources;
  b) calculating a composite description independent of tool technology of each feature in a borehole image based upon contrast between the feature and its background;
  c) interpreting the features based upon the contrast-based feature descriptions; and
  d) interpreting a geological feature based upon the feature interpretation.

* * * * *